United States Patent
Jahromi

(10) Patent No.: US 9,644,920 B2
(45) Date of Patent: *May 9, 2017

(54) TELESCOPIC GUN SIGHT WITH TILTING OPTICAL ADJUSTMENT MECHANISM

(71) Applicant: Omid S. Jahromi, Playa Vista, CA (US)

(72) Inventor: Omid S. Jahromi, Playa Vista, CA (US)

(73) Assignee: Lucida Research LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,613

(22) Filed: Jul. 17, 2014

(65) Prior Publication Data

US 2016/0018188 A1    Jan. 21, 2016

(51) Int. Cl.
| G02B 23/00 | (2006.01) |
| F41G 1/38 | (2006.01) |
| G02B 26/08 | (2006.01) |
| G02B 23/02 | (2006.01) |
| G02B 5/04 | (2006.01) |
| F41G 1/44 | (2006.01) |

(52) U.S. Cl.
CPC .............. *F41G 1/38* (2013.01); *G02B 23/02* (2013.01); *G02B 26/0891* (2013.01); *F41G 1/44* (2013.01); *G02B 5/04* (2013.01)

(58) Field of Classification Search
CPC ............ G02B 26/0875; G02B 26/0883; G02B 26/0891; G02B 23/14; G02B 23/145; F41G 1/38; F41G 1/44; F41G 1/473

USPC ....... 359/399, 423, 424, 426, 427, 428, 429, 359/431; 42/111, 119, 120, 122, 42/124–126, 130, 135–139

See application file for complete search history.

(56) References Cited

U.S. PATENT DOCUMENTS

| 2,816,481 A | * | 12/1957 | Farley | .................... G02B 13/10 |
| | | | | 359/678 |
| 2,828,670 A | | 4/1958 | Luboschez | |
| 3,782,822 A | * | 1/1974 | Spence | ................ G02B 23/145 |
| | | | | 356/21 |
| 3,948,587 A | * | 4/1976 | Rubbert | ................... G01C 3/22 |
| | | | | 356/21 |
| 4,017,160 A | * | 4/1977 | Betensky | ............... G02B 13/10 |
| | | | | 359/669 |
| 4,059,343 A | | 11/1977 | Kowalski et al. | |
| 4,364,628 A | * | 12/1982 | Garner | ................ G02B 27/646 |
| | | | | 356/247 |
| 4,806,007 A | * | 2/1989 | Bindon | .................... F41G 1/38 |
| | | | | 359/424 |
| 4,850,686 A | | 7/1989 | Morimoto et al. | |

(Continued)

OTHER PUBLICATIONS

Leupold, "Riflescope Owner's Handbook," Leupold & Stevens, 2007.*

(Continued)

*Primary Examiner* — Thomas K Pham
*Assistant Examiner* — Nicholas R Pasko

(57) ABSTRACT

A precision optical mechanism for adjusting the point of aim in telescopic gun sights is provided. A pair of thin wedge prisms are placed in the optical path of a telescopic gun sight such that they can tilt around an axis perpendicular to the optical axis of the sight. The sight's point of aim is adjusted by tilting the prisms.

6 Claims, 10 Drawing Sheets

(56) References Cited

U.S. PATENT DOCUMENTS

| | | | | |
|---|---|---|---|---|
| 6,295,170 | B1* | 9/2001 | Wallace | F41G 1/38 359/813 |
| 6,473,250 | B1* | 10/2002 | Chapman | G02B 26/0883 359/669 |
| 7,037,005 | B2* | 5/2006 | Kreger | G02B 26/0891 396/427 |
| 7,944,611 | B1* | 5/2011 | Regan | F41G 1/38 359/422 |
| 8,009,271 | B2* | 8/2011 | Omura | G02B 13/24 355/53 |
| 8,599,482 | B2* | 12/2013 | Schlierbach | F41G 3/065 359/428 |
| 8,749,887 | B2* | 6/2014 | Jahromi | F41G 1/38 359/399 |
| 9,164,269 | B1* | 10/2015 | Jahromi | F41G 1/38 |
| 2005/0039370 | A1* | 2/2005 | Strong | F41G 1/473 42/130 |
| 2011/0199586 | A1* | 8/2011 | Morikuni | G03B 21/208 353/81 |

OTHER PUBLICATIONS

Christopher T. Amrault and Charts A. Dimarzio, "Precision Pointing using a Dual-Wedge Scanner," NASA Contractor Report 3946, National Aeronautics and Space Administration, Nov. 1985.

Yajun Li, "Closed form analytical inverse solutions for Risley-prism-based beam steering systems in different configurations," Applied Optics, vol. 50, No. 22, Aug. 2011.

Yong-Geun Jeon, "Generalization of the first-order formula for analysis of scan patterns of Risley prisms," Optical Engineering, vol. 50, No. 11, Nov. 2011.

Miroslaw Ostaszewski, Steven Harford, Neil Doughty, Charlie Hoffman, Michael Sanchez, David Gutow and Robert Pierce, "Risley Prism Beam Pointer," SPIE Proceedings vol. 6304, Sep. 2006.

Yafei Lu, Yuan Zhou, Mo Hei, and Dapeng Fan, "Theoretical and experimental determination of steering mechanism for Risley prism systems," Applied Optics, vol. 52, No. 7, Mar. 2013.

Herbert Gross (Editor), Handbook of Optical Systems, vol. 1: Fundamentals of Technical Optics, Wiley-VCH, Mar. 2005.

* cited by examiner

TELESCOPIC GUN SIGHT WITH TILTING OPTICAL ADJUSTMENT MECHANISM

I. CROSS-REFERENCE TO RELATED APPLICATIONS

This application is related to U.S. Pat. No. 8,749,887 issued Jun. 10, 2014 and to U.S. patent application Ser. No. 14/324,605 filed Jul. 7, 2014.

II. FIELD OF THE INVENTION

This application relates to optical gun sights, specifically to an optical method of adjusting the point of aim in telescopic gun sights.

III. BACKGROUND OF THE INVENTION

A telescopic gun sight or a riflescope is a device used to provide an accurate point of aim for firearms such as rifles, handguns and shotguns. It is used with other types of weapons such as bows and crossbows as well. A telescopic sight can dramatically improve the functionality of a firearm by providing the shooter with a simple yet highly accurate means for aiming at distant targets.

FIG. 1 shows a common riflescope design. With reference to this figure, a riflescope is comprised of an objective lens 1 which forms a first image of the target on the objective focal plane 4. The objective lens has an optical axis 50 which defines the optical axis of the riflescope. The first image produced by the objective lens is upside down and laterally reversed. An image-erecting means comprising a pair of lenses 3a and 3b relay this first image to the eyepiece focal plane 5 and form a second, upright and laterally correct image there. An eyepiece lens 2 takes this second image and produces a virtual magnified image for the shooter to see.

In riflescopes, the "point of aim" is usually designated by a reticle or cross hairs. In FIG. 1, the reticle 20 is mounted coplanar with the eyepiece focal plane 5. However, it can also be mounted at the objective focal plane 4. In either case, the shooter will see an image of the reticle superimposed on the image of the target. Telescopic sights are equipped with two control knobs for elevation (up-down) and windage (left-right) adjustments. These knobs mechanically move the reticle so that the sight's point of aim can be aligned with the firearm's "point of impact". The amount of adjustment is usually very small and is measured in minutes of angle or MOA. For descriptions of the conventional mechanical methods commonly used to adjust the reticle within a telescopic sight see, for example, U.S. Pat. No. 2,955,512 issued Oct. 11, 1960 to Kollmorgen et al., U.S. Pat. No. 3,161,716 issued Dec. 16, 1964 to Burris et al., U.S. Pat. No. 5,463,495 issued Oct. 31, 1995 to Murg, and U.S. Pat. No. 5,615,487 issued Apr. 1, 1997 to Tomita.

An optical method for adjusting the point of aim in telescopic gun sights has been disclosed in U.S. Pat. No. 8,749,887 issued Jun. 10, 2014 to the present applicant. This patent teaches the use of two wedge prisms which move linearly along the optical axis to shift the image formed by the objective on the reticle. This novel optical method overcomes many of the drawbacks associated with the conventional mechanical methods.

A second optical method using counter-rotating (Risley) prisms has been disclosed in U.S. patent application Ser. No. 14/324,605 filed Jul. 7, 2014 by the present applicant.

The present application teaches an alternative optical method for adjusting the point of aim that utilizes tiltable wedge prisms. This method leads to a telescopic gun sight wherein the point of aim can be adjusted with extremely high precision. Implications and advantages of using tiltable prisms are discussed in detail in Section VI-G.

IV. SUMMARY OF THE INVENTION

In this invention, a beam-steering means comprising one or more tiltable wedge prisms is placed in the optical path of a telescopic gun sight to adjust its point of aim. The invention teaches mounting the beam-steering means in front of the objective lens (first embodiment), or after the objective lens but before the image-erecting means (second embodiment), or between the relay lenses that form the image-erecting means (third embodiment).

V. BRIEF DESCRIPTION OF THE DRAWINGS

The foregoing aspects and many of the attendant advantages of this invention will become more readily apparent with reference to the following detailed description of the invention, when taken in conjunction with the appended claims and accompanying drawings, wherein:

VI. DETAILED DESCRIPTION OF THE INVENTION

A. Beam-Steering Using a Tiltable Wedge Prism

A wedge prism may be used to deviate a monochromatic beam of light by a degrees where $$\alpha = \theta - \xi + \sin^{-1}(\sqrt{n^2 - \sin^2\theta} \times \sin \xi - \sin \theta \cos \xi). \quad (1)$$

In the above formula $\alpha$ is the beam deviation angle, $\xi$ is the apex angle of the prism, $\theta$ is the incidence angle of the incoming beam and n is the index of refraction of the glass material used for making the prism. The above formula suggests that we can adjust the beam deviation angle $\alpha$ by changing the incidence angle $\theta$. This is illustrated in FIG. 2(a).

A wedge prism deviates light beams of different color at slightly different angles. This is because the refraction index n in (1) depends on the wavelength of the light ray being refracted by the prism. One can obtain the value of n for standard red (C=656 nm), green (e=546 nm) and blue (F=486 nm) wavelengths from glass manufacturers such as Schott AG of Mainz, Germany. Since the exact amount of deviation produced by a wedge prism is wavelength dependent, a certain amount of "color dispersion" or "chromatic error" will be introduced when prisms are used for steering white light. This is illustrated in FIG. 3(a).

Figure 3A:
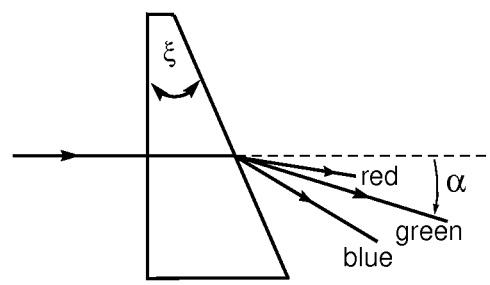
FIG. 3(a) is a side view showing color dispersion in a prism.

With reference to FIG. 3(a), if a beam of polychromatic light passes through a wedge prism, the colors will separate (This phenomenon is highly exaggerated in FIG. 3(a) for the purpose of illustration). It is common to calculate the deviation angle $\alpha$ of a wedge prism at the green e wavelength. The difference between red C and blue F wavelength deviations will be considered as chromatic error.

Figure 1:
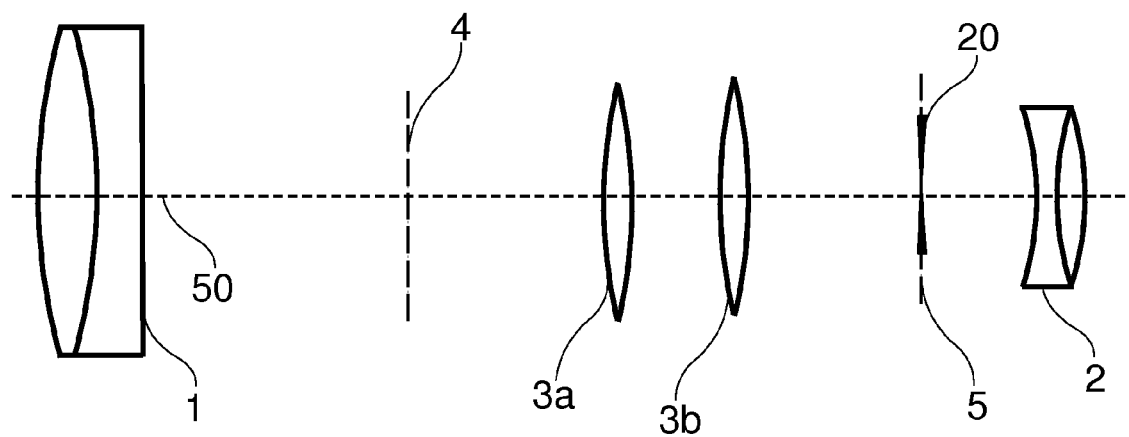
FIG. 1 is a side view schematic depicting the arrangement of optical elements in a conventional telescopic gun sight.
Figure 2A:
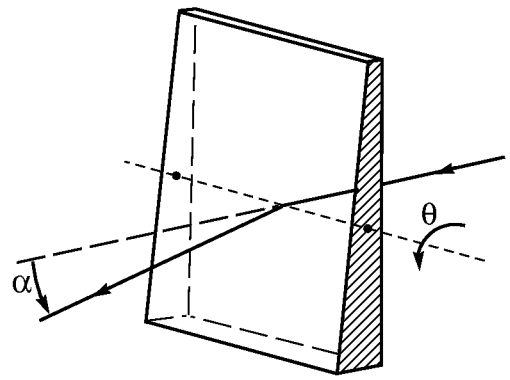
FIG. 2(a) is a perspective view showing beam deviation by a tiltable wedge prism.

FIG. 2(a) illustrates a beam-steering means formed by a single tiltable wedge prism. With reference to this figure, the beam deviation angle (or deflection angle) $\alpha$ is adjusted by changing the prism tilt angle $\theta$. A very interesting feature of this method of beam-steering is that the magnitude of the change in $\alpha$ is much less than the magnitude of the change in $\theta$. This phenomenon is demonstrated by the example below.

Example 1

Figure 4:
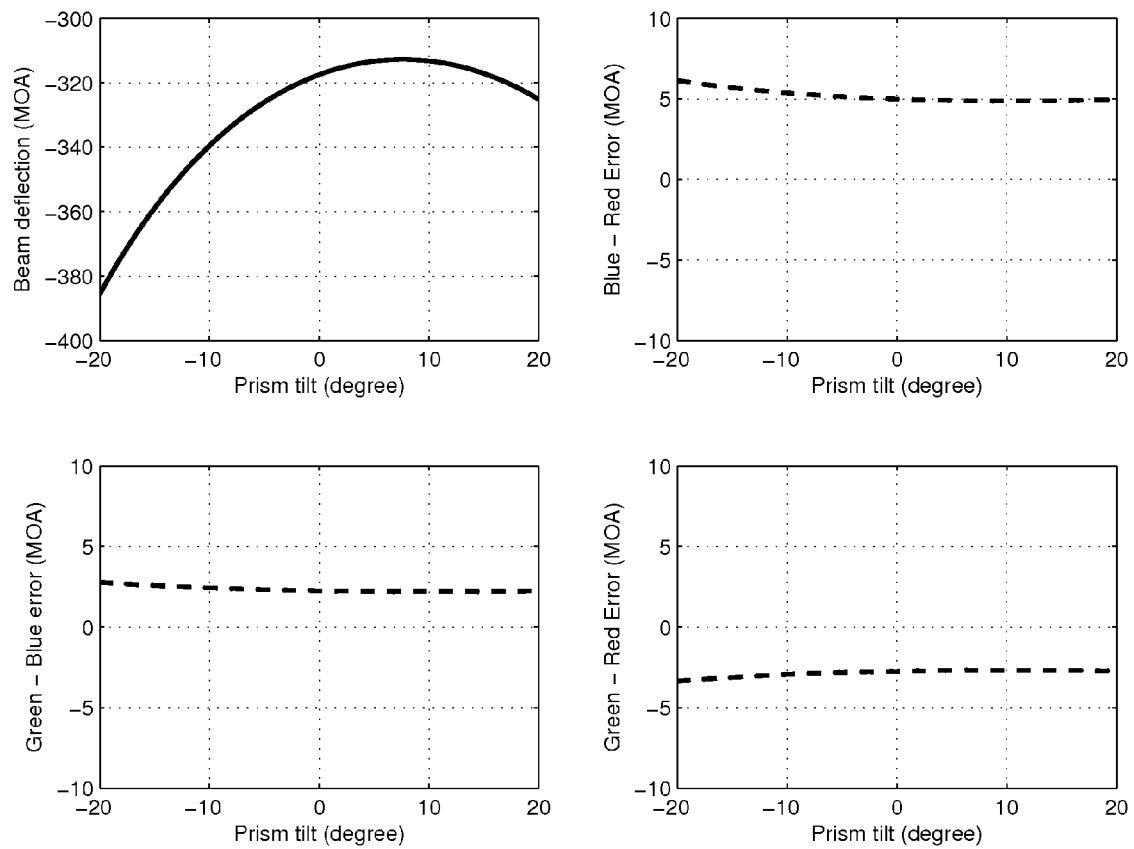
FIG. 4 shows beam-steering and chromatic error plots for the tiltable prism described in Example 1.

Consider a beam-steering means formed using a single tiltable prism as shown in FIG. 2(a). Assume that the prism has an apex angle $\xi=10°$ and is made of BK7 optical glass. The beam deviation and chromatic error characteristics of this beam-steering device are plotted in FIG. 4. The top-left plot in FIG. 4 shows the beam deviation characteristics of this prism for the central green wavelength. It is observed from this plot that the change in the beam deviation angle $\alpha$ is very small compared to the change in the tilt angle $\theta$. For instance, if we change $\theta$ in the region around $\theta=7°$ where the prism is at minimum deviation, the change in $\alpha$ will be virtually zero. If we tilt the prism from $\theta=0°$ to $\theta=-10°$, the beam-steering means produces about 20 MOA of "deviation adjustment" as $\alpha$ moves from −320 to −340 MOA.

Chromatic error (dispersion) characteristics of the BK7 prism described in this example are depicted in the dotted-line plots in FIG. 4. It is observed from the blue-red, green-red, and green-blue error plots that the magnitude of chromatic error for this prism is approximately 5 MOA.

Figure 3B:
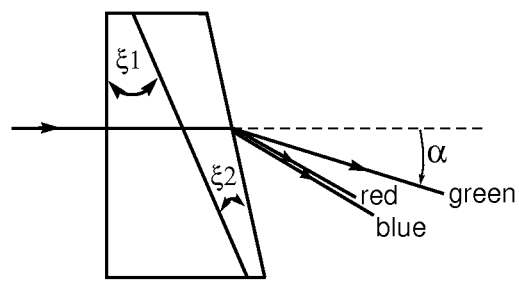
FIG. 3(b) is a side view showing color dispersion in an achromatic prism.

Chromatic error is significantly reduced if an achromatic prism is used. With reference to FIG. 3(b), an achromatic prism is made of two different glass types and is characterized by two apex angles $\xi_1$ and $\xi_2$. The glasses and the apex angles are chosen such that two wavelengths (usually the red C and the blue F standard wavelengths) exit the prism at the same deviation angle. A small difference between the deviation angle of the green e wavelength and the common deviation angle of the other two wavelengths will still remain. Persons skilled in the art of optical engineering would be familiar with the design of achromatic prisms. Therefore, it will be unnecessary to enter into a detailed exposition here.

The following example illustrates how chromatic error is reduced by using an achromatic prism.

Example 2

Consider a beam-steering means formed using a single tiltable achromatic prism. Assume that the achromatic prism is made of K7 crown and F2 flint glasses from the Schott glass catalog. The apex angles of the sub-prisms are chosen such that $\xi_1=10°$ and $\xi_2=4.92°$. The achromatic prism is mounted such that it can tilt with from $\theta$ ranging from −20° to 20°.

Figure 5:
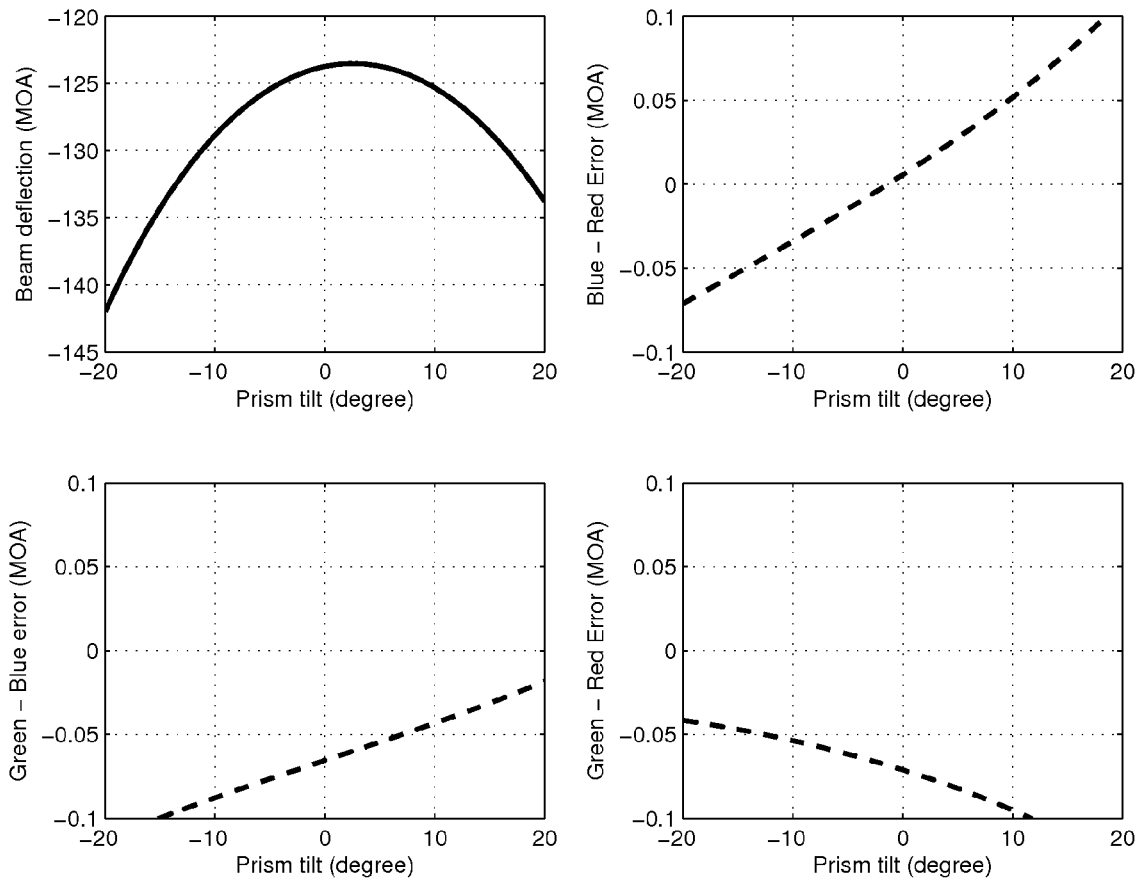
FIG. 5 shows beam-steering and chromatic error plots for the achromatic prism described in Example 2.

The beam deviation and chromatic error characteristics of this beam-steering system are depicted in FIG. 5. The top-left plot in FIG. 5 shows the beam deviation characteristics of this prism for the central green wavelength. Chromatic error (dispersion) characteristics of the achromatic prism described in this example are plotted in FIG. 4 as well. It is observed from the blue-red, green-red, and green-blue error plots that the magnitude of chromatic error for this prism is approximately 0.05 MOA.

It is worth noting that the dispersion errors of the achromatic prism in Example 2 are about 100 times less than those of the simple wedge prism described in Example 1.

A single-prism beam-steering system such as the one shown in FIG. 2(a) deviates the input beam even when the prism is not tilted. In other words, $\alpha \neq 0$ for any value of $\theta$. This is because a wedge prism has a non-zero "minimum deviation angle". For the prism described in Example 1, the minimum deviation angle is about 315 MOA as shown in the top-left plot in FIG. 4.

This minimum deviation can be made zero by adding a second prism to the beam-steering system.

B. Beam-Steering Using a Pair of Tiltable Wedge Prisms

Figure 2B:
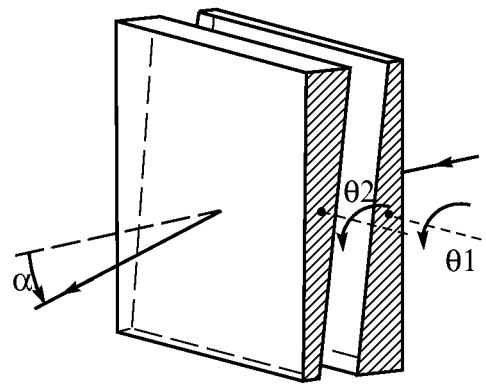
FIG. 2(b) is a perspective view showing beam deviation by a pair of tiltable wedge prisms.

A beam-steering means comprising a pair of wedge prisms is shown in FIG. 2(b). With reference to this figure, a beam-steering means includes two identical wedge prisms mounted such that they can tilt around an axis perpendicular to the optical axis. The prisms are mounted such that the base of one prism faces the apex of the other. This configuration behaves like a plain glass window when the prisms are not tilted. Therefore, $\alpha=0$ when $\theta_1=\theta_2=0°$.

The superior beam-steering characteristics of the two-prism system are illustrated in the example below.

Example 3

Consider a beam-steering means comprising two identical achromatic prisms mounted as shown in FIG. 2(b). The prisms are made of N-PK52A and N-KZFS2 optical glasses from the Schott catalog such that $\xi_1=10°$ and $\xi_2=5.2°$. The first prism is mounted such that it can tilt independently with $\theta_1$ ranging from −25° to 15°. The second prism is mounted such that its tilt angle follows the tilt angle of the first prism according to the equation below.

$$\theta_2 = -\theta_1 - 15°, \quad -25° \leq \theta_1 \leq 15° \quad (2)$$

Figure 6:
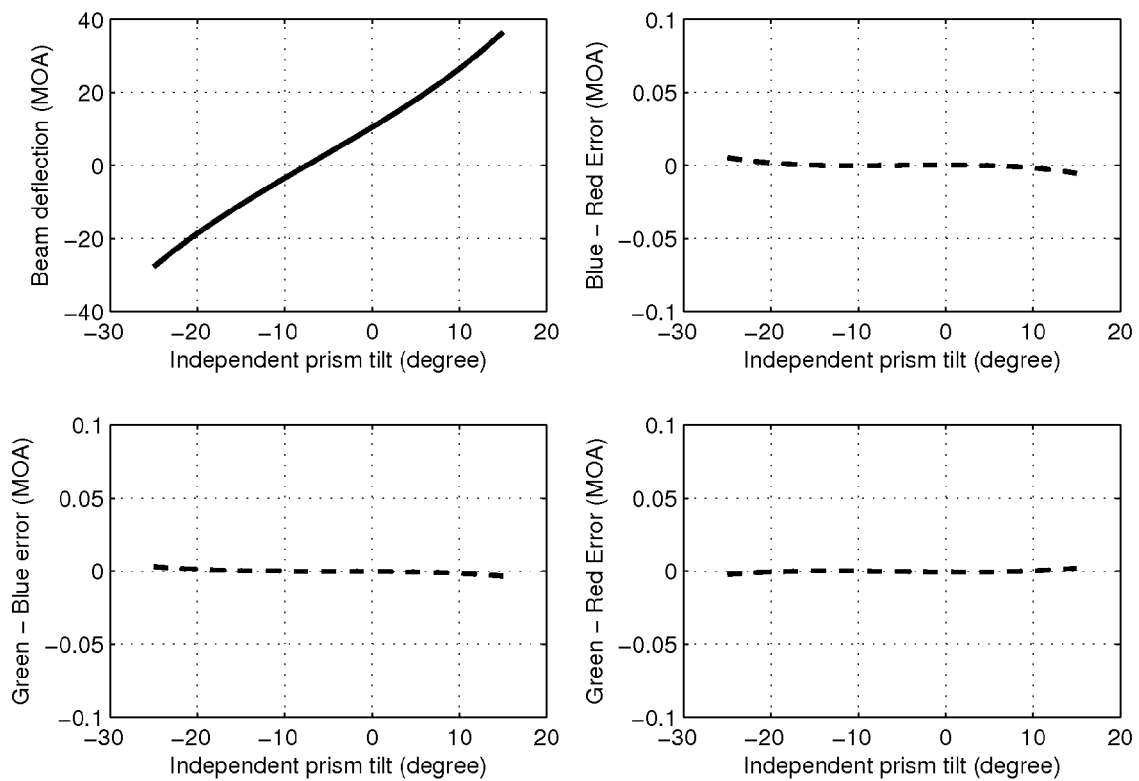
FIG. 6 shows beam-steering and chromatic error plots for the pair of achromatic prisms described in Example 3.

The plots in FIG. 6 show the superior performance of the resulting beam-steering system: The adjustment range is ±30 MOA, the adjustment is symmetric around $\alpha=0$, and the chromatic error is practically non existent.

The above example illustrates that a beam-steering means comprising two achromatic prisms can make very precise adjustments to the angle of a beam without needing precise mechanical movements. In the above example 40° tilt of the independently-tilting prism generates ±30 MOA (i.e. 1°) of adjustment to the beam. This means the optical beam-steering precision of the system is 40 times greater than its mechanical tilt precision. This is a highly desirable property for adjusting the point of aim in telescopic gun sights.

C. Beam-Steering Using Tiltable Wedge Prisms in Combination with an Afocal System A prismatic beam-steering means works best when it is applied to a collimated beam where light rays are parallel. If tiltable prisms are placed in the path of a focused beam in an image-forming system, the prisms will introduce abberations such as astigmatism and coma. In this section, we introduce two solutions that allow the use of a prismatic beam-steering means "inside" a telescopic gun sight.

Figure 7A:
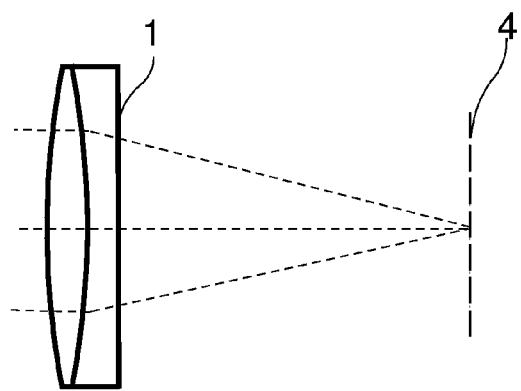
FIG. 7(a) illustrates the focused beam created by an objective lens.
Figure 7B:
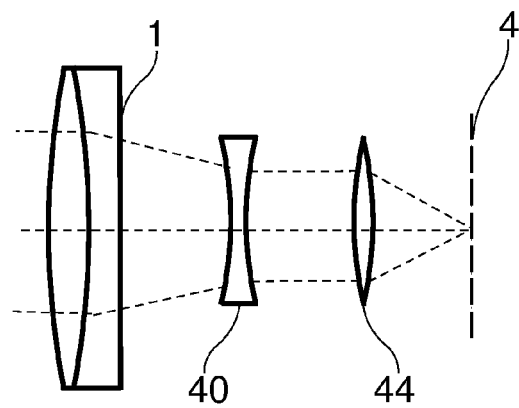
FIG. 7(b) shows how a collimated beam region can be created behind an objective lens.

Telescopic gun sights use an objective lens to form an image of the target as shown in FIG. 7(a). With reference to this figure, the objective lens 1 focuses the incoming light from the target and forms an image of the target on its focal plane 4. If we could shift this image up-down (or left-right) in the objective focal plane, the point of aim of the sight would change. However, as mentioned above, a prismatic beam-steering system cannot be applied directly to the focused beam created by an objective lens. To overcome this limitation, we place two lens elements 40 and 44 in the focused beam of the objective lens as shown in FIG. 7(b). With reference to this figure, the diverging (negative) lens 40 turns the focused beam produced by the objective lens into a collimated (parallel) beam. The converging (positive) lens 44 re-focuses this collimated beam and forms an image of the target on the objective focal plane 4. Now, if a prismatic beam-steering means is placed in the collimated light region between lenses 40 and 44, no serious coma or astigmatism is introduced. Thus, the arrangement shown in FIG. 7(b) allows the use of a tiltable prisms for shifting the image produced by an objective lens without undesirable side effects.

Figure 7C:
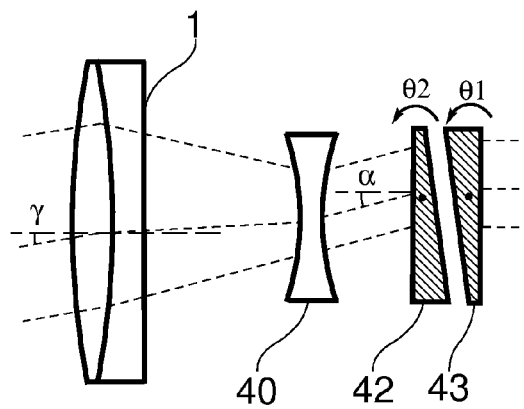
FIG. 7(c) shows a beam-steering means placed behind a Galilean afocal system.

FIG. 7(c) shows the key implication of placing a beam-steering means in the collimated light formed by an afocal system. With reference to this figure, the afocal system includes the objective lens 1 followed by the diverging lens 40. Persons skilled in the art will recognize that this afocal system is a Galilean telescope. This telescope will have a magnification (power) which we designate by N. If a pair of tiltable prisms 42 and 43 are added to adjust the direction of the beam exiting the diverging lens by α degrees, the field of view of this telescope will be adjusted by γ degrees where $$\gamma = \frac{\alpha}{N}. \quad (3)$$

The magnification N depends on the focal ratio of the lenses 1 and 40. It can be any number larger than 1. Therefore, we can say that the afocal system shown in FIG. 7(c) reduces the adjustment effect of the beam-steering means by a factor of N. This is a very desirable property for application in a riflescope since adjustments made to the point of aim are often very small (commonly a few MOA).

Figure 7D:
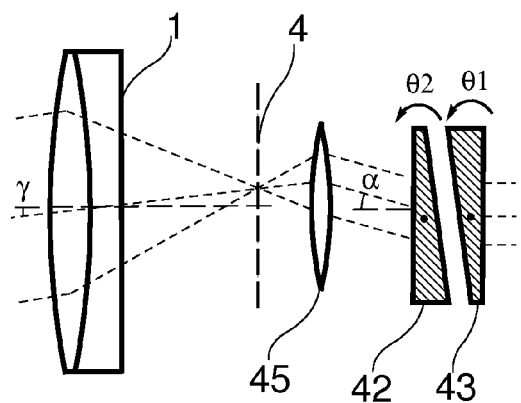
FIG. 7(d) shows a beam-steering means placed behind a Keplerian afocal system.

FIG. 7(d) shows a second method for creating a collimated beam region behind an objective lens. In this method, a converging (positive) lens 45 is positioned on the optical axis after the focal plane 4 of an objective lens 1. By correctly choosing the power and the position of lens 45, a collimated beam can be formed as shown in FIG. 7(d). Persons skilled in the art will recognize that the objective lens 1 together with the converging lens 45 form a Keplerian telescope. This telescope will have a magnification N depending on the focal ratio of lenses 1 and 45. A beam-steering means comprising tiltable prisms 42 and 43 may be placed in the collimated beam region after lens 45 and rotated to deviate the beam exiting lens 45 by α degrees. This will result in the field of view of the Keplerian telescope formed by lenses 1 and 45 to be adjusted by γ digress. The relation between α and γ is the same as given in (3) above.

D. First Embodiment of the Invention

Figure 8A:
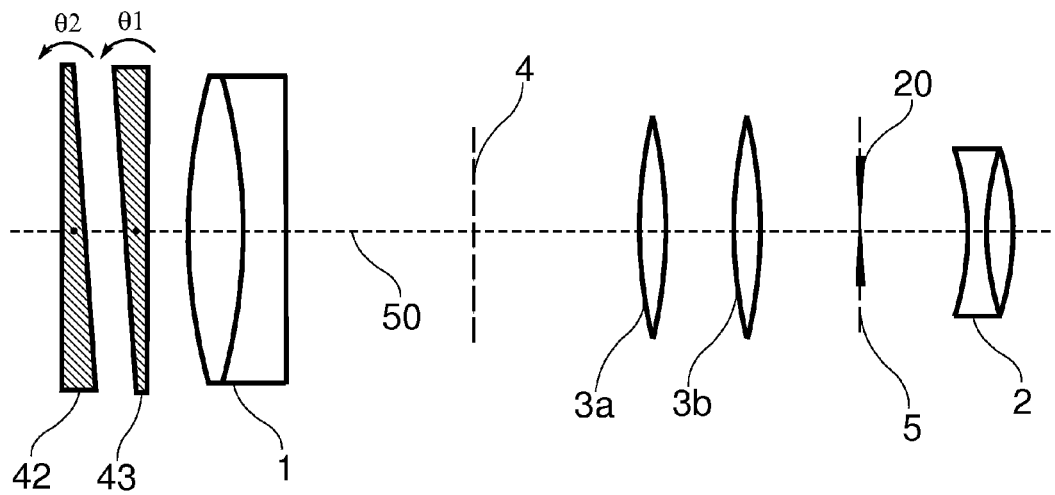
FIG. 8(a) is a side view schematic depicting the arrangement of elements in a first embodiment of the invention.
Figure 8B:
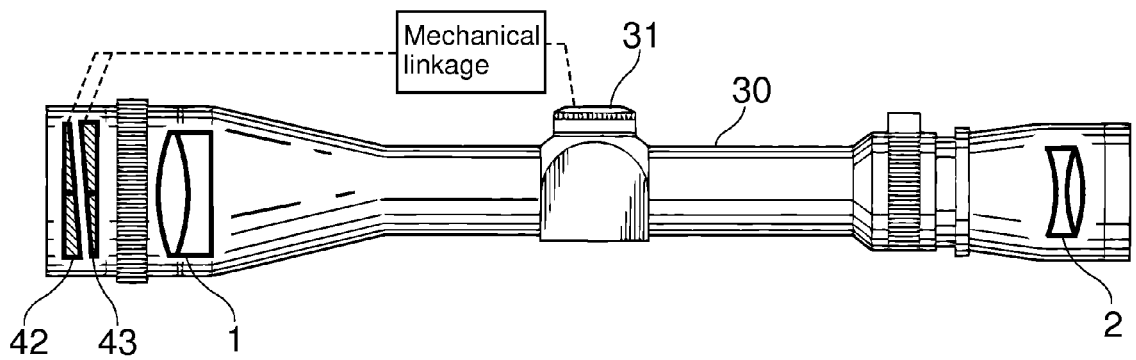
FIG. 8(b) is a side view schematic depicting housing and mechanical linkage means according to the first embodiment of the invention.

A first embodiment of the invention is shown in FIGS. 8(a) and 8(b). With reference to FIG. 8(a), a telescopic sight includes an objective lens 1 which forms a first image of the target on the objective focal plane 4. The objective lens has an optical axis 50 which defines the optical axis of the subsequent components as well. The first image produced by the objective lens is upside down and laterally reversed. An image-erecting means comprising a pair of lenses 3a and 3b relay this first image to the eyepiece focal plane 5 and form a second, upright and laterally correct image there. An eyepiece lens 2 takes this second image and produces a virtual magnified image for the shooter to see.

A reticle 20 is mounted at the objective focal plane 4 or at the eyepiece focal plane 5 to designate the point of aim. In FIG. 8(a), the reticle is shown to be mounted coplanar with the eyepiece focal plane 5. In either case, the shooter will see an image of the reticle superimposed on the image of the target.

A beam-steering means comprising a pair of wedge prisms 42 and 43 is placed on the optical axis in front of the objective lens 1. These prisms are mounted such that they are tiltable and their axis of tilt is perpendicular to the optical axis.

With reference to FIG. 8(b), the telescopic sight may further include a housing 30 to contain and hold the optical components. A mechanical linkage means is used to allow the shooter to tilt the wedge prisms 42 and 43 by turning a knob 31. Tilting the wedge prisms 42 and 43 adjusts the telescopic sight's point of aim.

The exact structure of the mechanical linkage means is not essential to the present invention. Persons skilled in the art would be familiar with the design of a suitable mechanical linkage means to tilt the wedge prisms 42 and 43 by a suitable amount when the external knob 31 is turned by the shooter.

To use the telescopic sight described in this embodiment, an operator (shooter) places his eye at the rear end of the telescopic sight shown in FIG. 8(b) and points the sight towards a target. He will see a virtual image of the target with an image of the reticle superimposed. This enables him to determine his point of aim on the target. To adjust the point of aim, the shooter turns the knob 31 which, via the mechanical linkage means, tilts the wedge prisms. Tilting the prisms will shift the image of the target formed on the reticle and adjust the point of aim.

E. Second Embodiment of the Invention

Figure 9A:
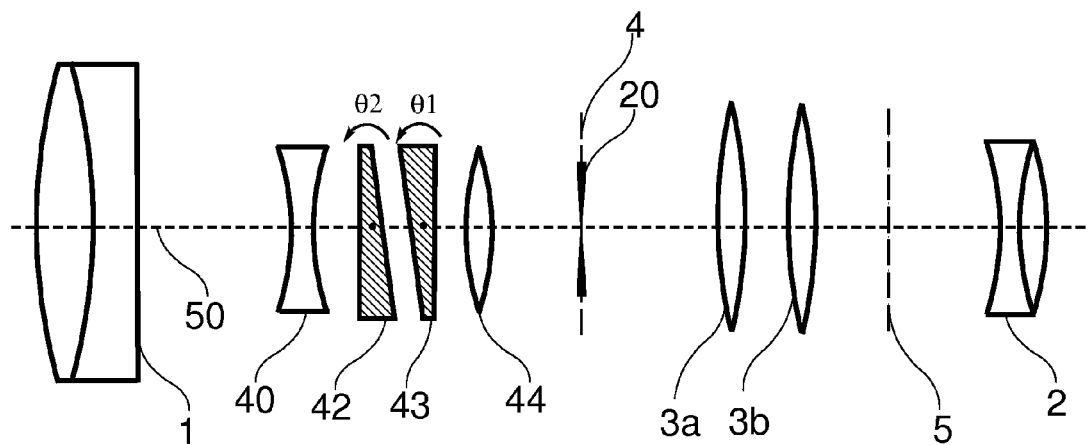
FIG. 9(a) is a side view schematic depicting the arrangement of elements in a second embodiment of the invention.
Figure 9B:
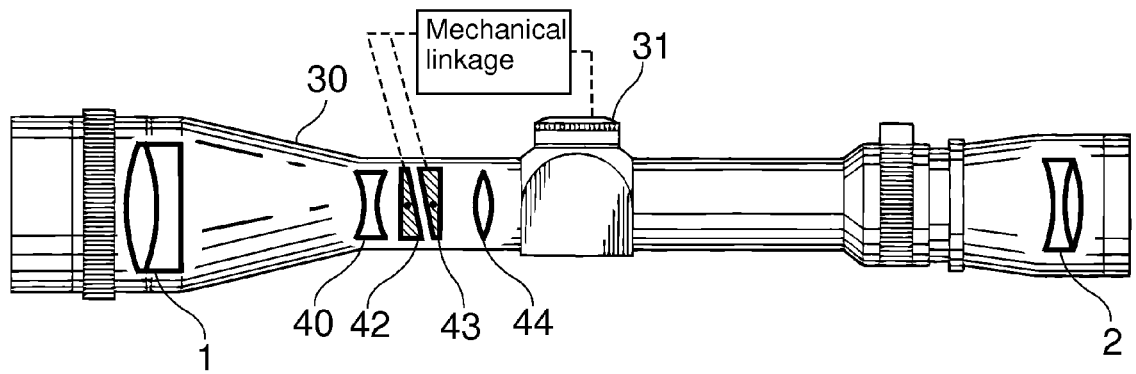
FIG. 9(b) is a side view schematic depicting housing and mechanical linkage means according to the second embodiment of the invention.

A second embodiment of the invention is shown in FIGS. 9(a) and 9(b). With reference to FIG. 9(a), a telescopic sight includes an objective lens 1 which forms a first image of the target on the objective focal plane 4. The objective lens has an optical axis 50 which defines the optical axis of the subsequent components as well. The first image produced by the objective lens is upside down and laterally reversed. An image-erecting means comprising a pair of relay lenses 3a and 3b relay this first image to the eyepiece focal plane 5 and form a second, upright and laterally correct image there. The eyepiece lens 2 takes this second image and produces a virtual magnified image for the shooter to see.

A reticle 20 may be placed at the objective focal plane 4 or at the eyepiece focal plane 5. In FIG. 9(*a*), the reticle is shown to be mounted coplanar with the objective focal plane 4. In either case, the shooter will see an image of the reticle superimposed on the image of the target.

A beam-steering means comprising a pair of wedge prisms 42 and 43 is placed on the optical axis after the objective lens 1 and before the objective focal plane 4. A diverging lens 40 is positioned before the beam-steering means to convert the focused beam produced by the objective lens 1 into a collimated beam. A converging lens 44 is positioned after the beam-steering means to convert the collimated beam back into a focused beam for forming an image on the objective focal plane 4. The wedge prisms 42 and 43 that form the beam-steering means are mounted such that they are tiltable and their axis of tilt is perpendicular to the optical axis.

With reference to FIG. 9(*b*), the telescopic sight may further include a housing 30 to contain and hold the optical components. A mechanical linkage means is used to allow the shooter to tilt the wedge prisms 42 and 43 by turning a knob 31. Tilting the wedge prisms 42 and 43 causes the image formed on the objective focal plane 4 to shift in a plane perpendicular to the optical axis. This, in turn, adjusts the telescopic sight's point of aim.

The exact structure of the mechanical linkage means is not essential to the present invention. Persons skilled in the art would be familiar with the design of a suitable mechanical linkage means that can tilt the wedge prisms 42 and 43 by a suitable amount when the external knob 31 is turned by the shooter.

To use the telescopic sight described in this embodiment, an operator (shooter) places his eye at the rear end of the telescopic sight shown in FIG. 9(*b*) and points the sight towards a target. He will see a virtual image of the target with an image of the reticle superimposed. This enables him to determine his point of aim on the target. To adjust the point of aim, the shooter turns the knob 31 which, via the mechanical linkage means, tilts the wedge prisms. Tilting the prisms will shift the image of the target formed on the reticle and adjust the point of aim.

F. Third Embodiment of the Invention

Figure 10A:
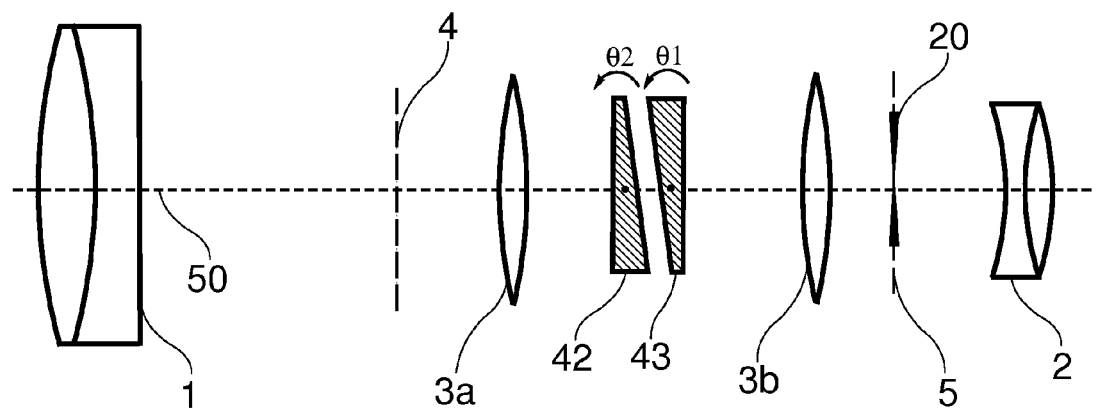
FIG. 10(a) is a side view schematic depicting the arrangement of elements in a third embodiment of the invention.
Figure 10B:
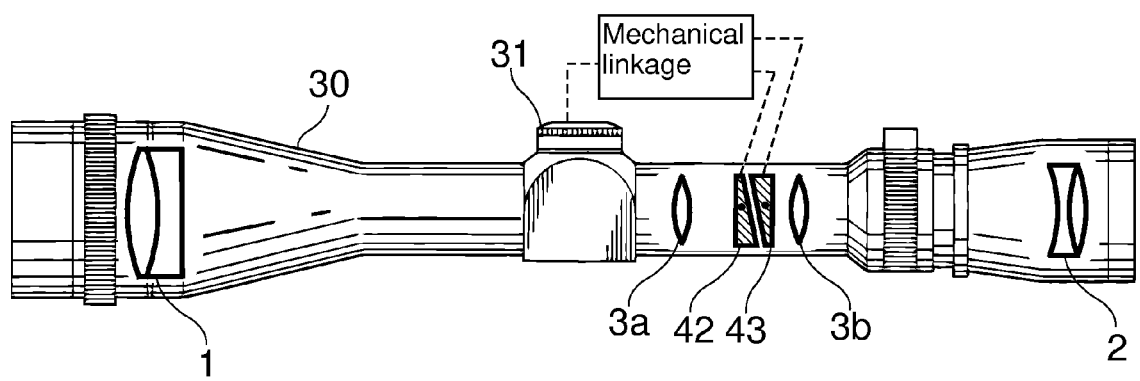
FIG. 10(b) is a side view schematic depicting housing and mechanical linkage means according to the third embodiment of the invention.

A third embodiment of the invention is shown in FIGS. 10(*a*) and 10(*b*). With reference to FIG. 10(*a*), a telescopic sight includes an objective lens 1 which forms a first image of the target on the objective focal plane 4. The objective lens has an optical axis 50 which defines the optical axis of the subsequent components as well. The first image produced by the objective lens is upside down and laterally reversed. An image-erecting means comprising a pair of converging lenses 3a and 3b relays this first image to the eyepiece focal plane 5 and forms a second, upright and laterally correct image there. The eyepiece 2 takes this second image and produces a virtual magnified image for the shooter to see. A reticle 20 is mounted coplanar with the eyepiece focal plane 5 to designate the point of aim. The shooter will see the reticle being superimposed on the image of the target.

A beam-steering means is positioned on the optical axis between the relay lenses 3a and 3b which form the image-erecting means. With reference to FIG. 10(*a*), the beam-steering means is comprised of a pair of tiltable wedge prisms 42 and 43. The position of relay lenses 3a and 3b on the optical axis 50 and their converging power are chosen such that the light beam is collimated in the region between the relay lenses.

With reference to FIG. 10(*b*), the telescopic sight may further include a housing 30 to contain and hold the optical components. A mechanical linkage means is used to allow the shooter to tilt the wedge prisms 42 and 43 by turning a knob 31. Tilting the wedge prisms 42 and 43 causes the image formed on the eyepiece focal plane 5 to shift in a plane perpendicular to the optical axis. This, in turn, adjusts the telescopic sight's point of aim.

The exact structure of the mechanical linkage means is not essential to the present invention. Persons skilled in the art would be familiar with the design of a suitable mechanical linkage means that can tilt the wedge prisms 42 and 43 by the proper amount when the external knob 31 is turned by the shooter.

To use the telescopic sight described in this embodiment, an operator (shooter) places his eye at the rear end of the telescopic sight shown in FIG. 10(*b*) and points the sight towards a target. He will see a virtual image of the target with an image of the reticle superimposed. This enables him to determine his point of aim on the target. To adjust the point of aim, the shooter turns the knob 31 which, via the mechanical linkage means, tilts the wedge prisms. Tilting the prisms will shift the image of the target formed on the reticle and adjust the point of aim.

G. Advantages

Based on the above descriptions of some embodiments of the invention, a number of advantages of one or more aspects over prior art are readily apparent:

1. The adjustment range provided by the mechanical methods used in conventional telescopic sights are limited due to the finite physical size of the sight's main tube. In contrast, the optical adjustment method described in this invention allows for virtually any amount of elevation or windage adjustment in a telescopic gun sight.
2. The adjustment range provided by the mechanical methods used in conventional telescopic sights become dependent near their maxima and minima. This is because of the circular shape of the main tube (housing) used in these sights. In contrast, the optical adjustment method described in this invention can produce completely independent adjustments for elevation and windage.
3. It is possible to adapt the invention to use multiple beam-steering means in tandem. A multi-stage implementation would allow for quick setting of large adjustment values using separate "fine-tuning" and "coarse-tuning" knobs.
4. It is possible to adapt the invention such that a combination of different embodiments are used. For example, a telescopic gun sight may use the optical adjustment method described in the first embodiment for elevation adjustment and the method described in the second embodiment for windage adjustment.

5. In the first embodiments, the beam-steering means can be easily added or retro-fitted to an existing telescopic sight. It is not necessary to re-design the optical system of the sight to accommodate the prismatic beam-steering means.
6. In the second and the third embodiments, the invention allows for the use of smaller and lighter wedge prisms. This is because the diameter of the collimated beam that passes through the beam-steering means is smaller than the diameter of the objective lens in these two embodiments.
7. Tiltable wedge prisms allow for very prices elevation or windage adjustments in a telescopic gun sight. This is because the precision by which the prisms deviate light is far grater than the precision by which the prisms are mechanically tilted.
8. By positioning the beam-steering means in collimated light, the invention eliminates optical abberations such as coma and astigmatism.

These and other advantages of one or more aspects may now be apparent to the reader from a consideration of the foregoing description and accompanying drawings.

VII. CONCLUSION, RAMIFICATIONS, AND SCOPE

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

While the above descriptions of the present invention contain numerous specificities, they should not be construed as limiting the scope of the invention, but as mere illustrations of some of the preferred embodiments thereof. Many other ramifications and variations are possible within the expositions of the various embodiments. For example:
1. For simplicity and brevity, we have discussed and illustrated adjustment in only one direction in the description of the embodiments above. It is understood that by applying knowledge within the skill of the art, one can readily adapt the methodology described in this invention for adjusting a telescopic sight's point of aim in both vertical and horizontal directions. For instance, in the second embodiment of the invention, two pairs of tiltable prisms can be placed between the lenses 40 and 44 to provide separate elevation and windage adjustments. Similarly, one may add a second beam-steering means to the arrangement of elements described in the first and the third embodiments to obtain independent elevation and windage adjustments.
2. In FIGS. 8(*a*), 8(*b*), 9(*a*), 9(*b*), 10(*a*), and 10(*b*), the tiltable prisms are shown as plain wedge prisms. It is understood that the tiltable prisms forming the beam-steering means may be achromatic prisms.
3. In FIGS. 8(*a*), 8(*b*), 9(*a*), 9(*b*), 10(*a*), and 10(*b*), the beam-steering means is shown being comprised of a pair of tiltable prisms. It is understood that the beam-steering means may be comprised of one or more tiltable prisms.

Therefore, such adaptations and modifications are intended to be within the meaning and range of equivalents of the disclosed embodiments, based on the teachings and guidance presented herein.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. Thus, the scope of the invention should be determined by the appended claims and their legal equivalents, as opposed to the embodiments illustrated.

What is claimed is:
1. A telescopic sight for designating a weapon's point of aim when pointed at a target, comprising:
    a. an objective lens for forming a first image of the target, said objective lens having a first focal plane, said objective lens having an optical axis,
    b. an image-erecting means for converting said first image into an upright and laterally-correct second image, said image erecting means being positioned on the objective optical axis on an image side of said objective lens,
    c. an eyepiece lens for converting said second image into a virtual third image of the target viewable by a shooter, said eyepiece lens having a second focal plane, said eyepiece lens being positioned on the objective optical axis on an image side of said image erecting means,
    d. a reticle for indicating the point of aim, said reticle being positioned coplanar with either said first focal plane or said second focal plane,
    e1. a first wedge prism, said first wedge prism having an entrance surface, an exit surface, an apex and a base, said first wedge prism being positioned on a target side of said objective lens on the objective optical axis, said first wedge prism being tiltable about a first tilt axis perpendicular to the objective optical axis such that the entrance surface and the exit surface of said first wedge prism simultaneously tilt about said first tilt axis,
    e2. a second wedge prism, said second wedge prism having an entrance surface, an exit surface, an apex and a base, said second wedge prism being positioned adjacent to said first wedge prism such that its apex faces the base of said first wedge prism, said second wedge prism being tiltable about a second tilt axis such that the entrance surface and the exit surface of said second wedge prism simultaneously tilt about said second tilt axis, said second tilt axis being perpendicular to the objective optical axis, said second tilt axis being parallel with said first tilt axis,
    e3. the tilt angles of said first wedge prism and said second prism being such that the two prisms as a whole tilt the light beam entering the objective lens making the image of the target shift with respect to the reticle,
    f. a knob which can be moved or turned by the shooter to select an adjustment setting, and
    g. a mechanical linkage for tilting said first wedge prism and said second wedge prism to predetermined angles when said knob is set to a predetermined adjustment setting,
    whereby the shooter can view and use said third image of the target for the purpose of aiming and shift a position of the reticle on the target image by adjusting said knob.
2. The telescopic sight of claim 1 wherein said first wedge prism and said second wedge prism are achromatic.
3. A telescopic sight for designating a weapon's point of aim when pointed at a target, comprising:
    a. an objective lens for forming a first image of the target, said objective lens having a first focal plane, said objective lens having an optical axis, b. an image-erecting means for converting said first image into an upright and laterally-correct second image, said image erecting means being positioned on the objective optical axis on an image side of said objective lens, said image erecting means being positioned after said first focal plane, c. an eyepiece lens for converting said second image into a virtual third image of the target viewable by a shooter, said eyepiece lens having a second focal plane, said eyepiece lens being positioned on the objective optical axis on an image side of said image erecting means, d. a reticle for indicating the point of aim, said reticle being positioned coplanar with either said first focal plane or said second focal plane, e. a diverging lens and a converging lens, said diverging lens being positioned on the objective optical axis between said objective lens and said first focal plane, said converging lens being positioned on the objective optical axis between said diverging lens and said first focal plane, f1. a first wedge prism, said first wedge prism being positioned on the objective optical axis between said diverging lens and said converging lens, said first wedge prism having an entrance surface, an exit surface, an apex and a base, said first wedge prism being tiltable about a first tilt axis perpendicular to the objective optical axis such that the entrance surface and the exit surface of said first wedge prism simultaneously tilt about said first tilt axis, f2. a second wedge prism, said second wedge prism having an apex and a base, said second wedge prism being positioned adjacent to said first wedge prism such that its apex faces the base of said first wedge prism, said second wedge prism being tiltable about a second tilt axis perpendicular to the objective optical axis such that the entrance surface and the exit surface of said second wedge prism simultaneously tilt about said second tilt axis, said second tilt axis being parallel with said first tilt axis, f3. the tilt angles of said first wedge prism and said second prism being such that the two prisms as a whole tilt the light beam passing through them making the image of the target shift with respect to the reticle, g. a knob which can be moved or turned by the operator shooter to select an adjustment setting, and h. a mechanical linkage for tilting said first wedge prism and said second prism to predetermined angles when said knob is set to a predetermined adjustment setting, whereby the shooter can view and use said third image of the target for the purpose of aiming and shift a position of the reticle on the target image by adjusting said knob.

4. The telescopic sight of claim 3 wherein said first wedge prism and said second wedge prism are achromatic.

5. A telescopic sight for designating a weapon's point of aim when pointed at a target, comprising:

a. an objective lens for forming a first image of the target, said objective lens having a first focal plane, said objective lens having an optical axis, b. a pair of relay lenses for converting said first image into an upright and laterally-correct second image, said pair of relay lenses being positioned on the objective optical axis on an image side of said objective lens, said pair of relay lenses comprising a first converging lens and a second converging lens, said pair of relay lenses being positioned after said first focal plane, c. an eyepiece lens for converting said second image into a virtual third image of the target viewable by a shooter, said eyepiece lens having a second focal plane, said eyepiece lens being positioned on the objective optical axis on an image side of said image-erecting means, d. a reticle for indicating the point of aim, said reticle being positioned coplanar with said second focal plane, e1. a first wedge prism, said first wedge prism being positioned on the objective optical axis between said first converging lens and said second converging lens, said first wedge prism having an entrance surface, an exit surface, an apex and a base, said first wedge prism being tiltable about a first tilt axis perpendicular to the objective optical axis such that the entrance surface and the exit surface of said first wedge prism simultaneously tilt about said first tilt axis, e2. a second wedge prism, said second wedge prism having an entrance surface, an exit surface, an apex and a base, said second wedge prism being positioned adjacent to said first wedge prism such that its apex faces the base of said first wedge prism, said second wedge prism being tiltable about a second tilt axis perpendicular to the objective optical axis such that the entrance surface and the exit surface of said second wedge prism simultaneously tilt about said second tilt axis, said second tilt axis being parallel with said first tilt axis, e3. the tilt angles of said first wedge prism and said second prism being such that the two prisms as a whole tilt the light beam passing through them making the image of the target shift with respect to the reticle, f. a knob which can be moved or turned by the shooter to select an adjustment setting, and g. a mechanical linkage for tilting said first wedge prism and said second prism to predetermined angles when said knob is set to a predetermined adjustment setting, whereby the shooter can view and use said third image of the target for the purpose of aiming and shift a position of the reticle on the target image by adjusting said knob.

6. The telescopic sight of claim 5 wherein said first wedge prism and said second wedge prism are achromatic.

* * * * *